United States Patent [19]

Bachmann et al.

[11] Patent Number: 4,871,383
[45] Date of Patent: Oct. 3, 1989

[54] METHOD OF MANUFACTURING OPTICAL FIBRES

[75] Inventors: Peter K. Bachmann; Hans-Jürgen E. Hagemann, both of Aachen, Fed. Rep. of Germany; Jacques P. M. Warnier, Eijsden, Netherlands; Howard J. C. Wilson, Aachen, Fed. Rep. of Germany

[73] Assignee: U.S. Philips Corp., New York, N.Y.

[21] Appl. No.: 206,644

[22] Filed: Jun. 14, 1988

[30] Foreign Application Priority Data

Jun. 16, 1987 [DE] Fed. Rep. of Germany ....... 3720028

[51] Int. Cl.$^4$ ............................................. C03B 37/018
[52] U.S. Cl. ........................................ 65/3.12; 65/18.2; 427/38; 427/163; 427/237
[58] Field of Search .................. 65/3.12, 18.2; 427/38, 427/39, 163, 167, 237

[56] References Cited

U.S. PATENT DOCUMENTS

Re. 30,635  6/1981  Kuppers ................................. 427/39
4,263,032  4/1981  Sinclair ................................. 65/3.12
4,417,911  11/1983  Cundy ................................. 65/3.12
4,741,747  5/1988  Geittner ................................. 65/3.12

FOREIGN PATENT DOCUMENTS 2079267  1/1982  United Kingdom ................. 65/3.12

Primary Examiner—Kenneth M. Schor
Attorney, Agent, or Firm—Ernestine C. Bartlett

[57] ABSTRACT

Polarization-retaining optical fibres are manufactured according to the PCVD method, in which on the inside of a glass tube (1) and, simultaneously on at least two glass rods (2, 3) which are arranged inside the glass tube such that their longitudinal axes run parallel to the longitudinal axis of the glass tube, glass is deposited in layers and the glass rods are removed from the glass tube upon completion of the glass deposition process. Alternatively, a single glass rod, the radial dimensions of which in two mutually perpendicular directions are in a ratio unequal to one, is arranged in a glass tube such that its longitudinal axis coincides with the longitudinal axis of the glass tube.

6 Claims, 1 Drawing Sheet

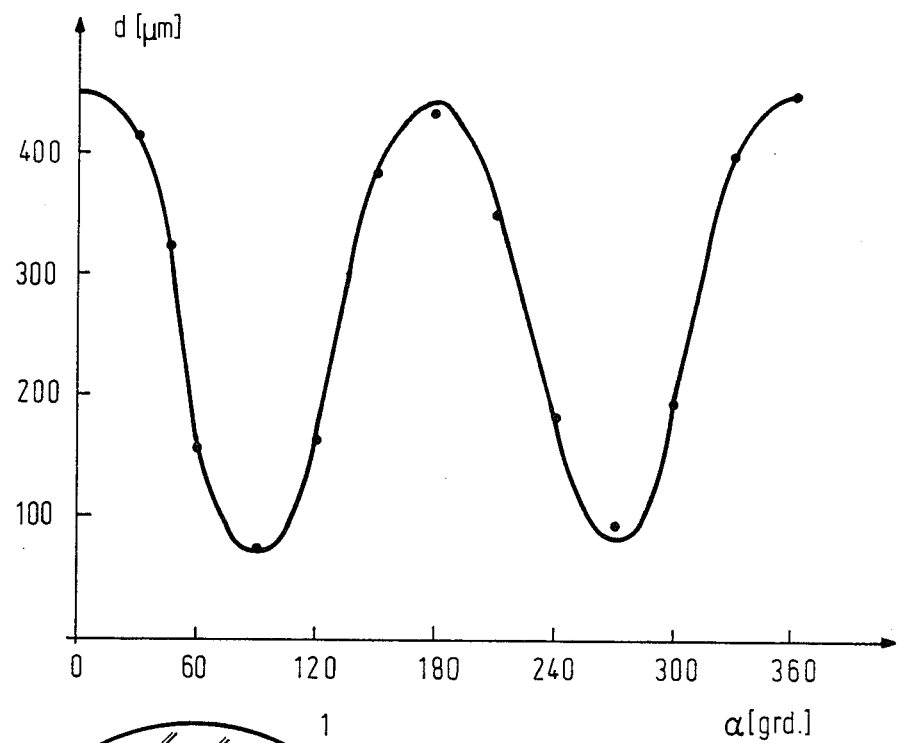
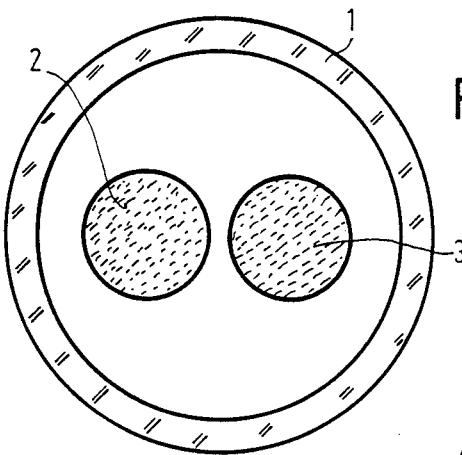
Fig.1   Fig.2
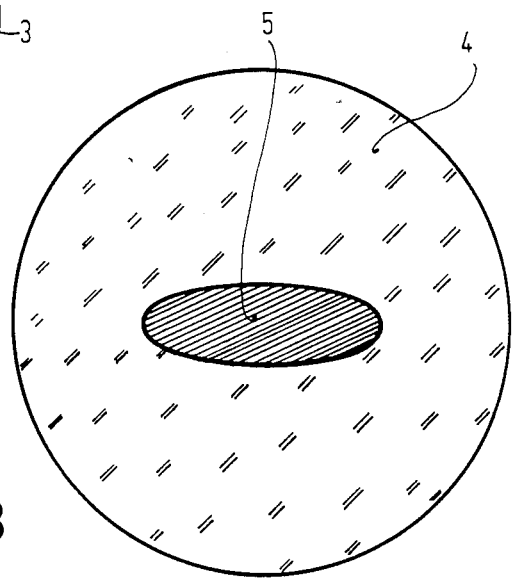
Fig.3

METHOD OF MANUFACTURING OPTICAL FIBRES

BACKGROUND OF THE INVENTION

The invention relates to a method of manufacturing optical fibres, in which glass is deposited in layers on the inner wall of a glass tube which is heated to a temperature between 1100° and 1300° C., and simultaneously on a glass rod which is arranged inside the glass tube, by leading a reactive gas mixture through the glass tube at a pressure between 1 and 30 hPa, while inside the glass tube a plasma is made to reciprocate strokewise between two reversal points after which the glass tube is made to collapse, following the deposition of a quantity of glass which corresponds to the intended construction of the optical fibre, so as to form a solid preform from which optical fibres are drawn.

A glass tube and a glass rod are to be understood to mean herein a substrate tube or a tube to be coated and a rod, which consist of synthetically manufactured amorphous silica or of amorphous silica manufactured from quartz crystals by melting fused silica, quartz glass, with the tube material possibly being doped, or which consist of both synthetically manufactured amorphous silica and amorphous silica manufactured from quartz crystals by melting (fused silica, quartz glass), with the tube material optionally being doped. The deposited glass consists of synthetically manufactured amorphous silica which is optionally doped.

The manufacture of optical fibres or optical waveguides according to the above-mentioned method is known from U.S. Pat. Nos. Re. 30 635 and 43 14 833, the version in which the glass is simultaneously deposited on a glass rod arranged inside the glass tube, being known from U.S. Pat. No. Re. 30 635. The method of manufacturing except for said version is in practice referred to as "nonisothermal plasma-CVD-method" (nonisothermal PCVD method, in which P=plasma and CVD=chemical vapour deposition=reactive deposition from the gas phase). In this method, glass layers are directly deposited from the gas phase on the inner wall of the glass tube (hetereogeneous reaction). In this way, the formation of glass soot in the gas phase is prevented; this is described in greater detail in, in particular, U.S. Pat. No. 43 14 833.

By means of the PCVD method both graded-index fibres and stepped-index fibres can be manufactured, with quantities of glass being deposited which correspond to the relevant construction of the fibre.

Single-mode optical fibres having radially symmetrical refractive index profiles can transmit both orthogonally polarized $HE_{11}$-modes. Mode-coupling is obtained by quasi statistically distributed internal and external interferences, so that light transmission while preserving the original direction of polarization is impossible with these fibres. However, polarization-retaining optical fibres are of great interest for applications in interferometry, in coherent optical communication systems, in non-linear optics etc. It is known that such fibres can be obtained by using refractive index profiles which are not radially symmetrical, i.e. having elliptical or other unround fibre cores (for example EP Pat. No. 47 037, U.S. Pat. No. 41 06 847) or by stress-induced birefringence in the core by means of a non-circular, stress-producing optical cladding (for example U.S. Pat. No. 42 74 854). Many appropriate structures for polarization retaining fibres and methods of manufacturing such structures are described by, inter alia, R. H. Stolen et al. (Electron, Lett. 18 (1982) 764–765), T. Hosaka (Electron. Lett 17 (1981) 530–531, R. D. Birch et al. (Electron. Lett. 18 (1982) 1036–1037) and S. C. Rashleigh and R. H. Stolen (Fiberoptic Techn. (May 1983) 155–160). As regards internal coating methods, all known manufacturing methods are based on mechanical processes to which the substrate tube is subjected (for example grinding or polishing), on deformation during collapsing using an underpressure or on chemical etching (for example gas phase itching or etching in combination with photolithographic means). However, all these techniques have the disadvantage that interfering with the customary fibre-manufacturing process is necessary, causing the introduction of impurities or problems with cracks occuring in the preform, or that the desired geometrical and optical profiles are only reproducible with great difficulties.

SUMMARY OF THE INVENTION

It is an object of the invention to provide a method which enables polarization-retaining optical fibres to be manufactured by means of the PCVD method.

This object is achieved according to the invention is that in a method of the type described in the opening paragraph at least two glass rods are arranged inside the glass tube in such a way that their longitudinal axes run parallel to the longitudinal axis of the glass tube, and that the glass rods are removed from the glass tube upon completion of the glass deposition process.

The above-described object can alternatively be achieved according to the invention in that in a method of the type achieved in the opening paragraph a glass rod is selected, the radial dimensions of which in two mutually perpendicular directions are in a ratio unequal to one, in that the glass rod is arranged in such a way that its longitudinal axes coincides with the longitudinal axis of the glass tube, and in that the glass rod is removed from the glass tube upon completion of the deposition process.

In the first mentioned method according to the invention, preferably, at least two glass rods having a circular cross-section are arranged inside the glass tube. The advantage of the circular cross-section is that sufficiently rigid glass rods can readily be obtained from suitable fused silica material.

Moreover, in the first method according to the invention it is advantageous to select the diameter of the rods such that the radio between the rod diameters and the inside diameter of the glass tube amounts to between 0.2 to 0.7. Thus, the proper dependence of the layer thickness of the deposited layer on the angle is obtained.

In the latter mentioned method according to the invention, preferably, a glass rod is selected, the radial dimensions of which in two mutually perpendicular directions are in a ratio of from 1:1.5 to 1:4. This ratio has the advantage that the desired dependence of the layer thickness of the deposited layer can be obtained without having to meet requirements in the deposition process which are unsuitable for the PCVD method.

The possibility of generating a low-pressure plasma in the substrate tube by means of a microwave resonator is not adversely affected by the presence of glass rods in the tube. Rather, a deposited of doped or undoped quartz glass on the inner wall of the substrate tube and on the periphery of the rods present inside the tube takes place.

To bring about the deposition, a reactive gas mixture of $O_2$, $SiCl_4$ and gaseous such as, for example, $GeCl_4$ or $C_2F_6$ are led through the tube-rod combination at a pressure between 500 and 2500 Pa, while in the glass-free inner space between the tube and the rod a plasma is reciprocated periodically between two reversal points. During the coating process, the tube-rod combination is heated to a temperature between 1300 and 1600 K.

After glass has been deposited in layers in this way and according to the intended optical fibre construction, the rod or the rods is or are removed from the substrate tube and the tube only is made to collapse to obtain a solid preform from which an optical fibre is drawn.

Using the invented method, fibres of any desired refractive index gradient can be manufactured, for example, graded-index and stepped-index fibres having profiles with a predetermined angle-dependence of the refractive index.

In the method according to the invention, tube/rod combinations are used in order to deposit glass layers on the inner wall of the substrate tube, whose layer thickness differs among the periphery of the tube by means of the PCVD method in a simple manner.

Owing to the arrangement of the rods according to the invention, it is attained in the deposition of glass according to the PCVD method that the thickness of the layers deposited varies with a period of 180° along the periphery of the substrate tube.

First, the cladding glass is deposited and then the core glass is deposited. The layer thicknesses and the dopants are selected so that a single mode optical fibre can subsequently be manufactured from the preform. For an optimum realization of the object according to the invention, the refractive index difference $\Delta n$ between the core and the cladding should be as large as possible. Preferably, $\Delta n$ is adjusted to values between $7.5 \times 10^{-3}$ and $1.5 \times 10^{-2}$, which can be obtained, for example, by a $GeO_2$ doping in the core area and by an undoped, F-doped, or B-doped cladding.

After the coating process, the rods or the rod are or is removed from the substrate tube, and after collapsing a preform is obtained having an elliptical core and an elliptical optical cladding with large eccentricities which are retained during the drawing of the optical fibre.

The elliptical shape of the core leads to geometrical birefringence $B_g$ and, hence, to polarization-preservation in the single-mode optical fibre:

$$B_g \sim (\Delta N)^2 \sqrt{1 - (b/a)^2} \quad (1)$$

a = large semi-axis of the core ellipse
b = small semi-axis of the core ellipse.

When a cladding glass is deposited whose doping differs from that of the glass tube, such that the optical cladding and the outer substrate consist of differently doped glass, a stress birefringence $B_s$ occurs in addition to the geometrical birefringence, which further enhances the polarization-retaining property of the fibre-type manufactured according to the invention:

$$B_s(P_{11} - P_{12})\Delta\alpha\Delta T(A-B)/A+B) \quad (2)$$

$P_{11}$, $P_{12}$ = stress optical coefficients
$\Delta\alpha$ = difference between the coefficients of thermal expansion of the optical cladding and the substrate cladding
$\Delta T$ = the difference between the softening temperature and the ambient temperature
A = large semi-axis of the cladding ellipse
B = small semi-axis of the cladding ellipse.

The stress-birefringence is particularly pronounced when, in an embodiment according to the invention, B-doped glass is deposited as an optical cladding.

BRIEF DESCRIPTION OF THE DRAWINGS

The invention will now be explained in greater detail by means of an example and with reference to a drawing, in which FIG. 1 is a cross-sectional view of two glass rods arranged in a glass tube, FIG. 2 is a diagrammatic representation of the angle dependence of the thickness of the layer deposited, and FIG. 3 is a cross-sectional view of a preform.

DETAILED DESCRIPTION OF PREFERRED EMBODIMENTS

In the example, preforms having a stepped-index profile were manufactured by means of the PCVD method. The resonator rate was 12 cm/s over a stroke length of 80 cm. Near the reversal points the rate of the resonator was reduced to nil over a distance of approximately 1 cm, and increased again to 12 cm/s in the opposite direction. The ratio of the $O_2$ flow to the chloride flow ($SiCl_4$ and $GeCl_4$) was 5:1. During the deposition process, the pressure was adjusted to 1800 Pa and the substrate temperature was 1500 K. After the deposition process, the preforms were collapsed and measured in regard of the geometry of the deposited material and the refractive index difference between the deposited material and the $SiO_2$ substrate tube.

To demonstate that the object according to the invention, i.e. the manufacture of polarization-retaining fibres using the PCVD method, is achieved, it was shown by way of experiment that due to the presence of two quartz rods in the substrate tube during the coating process a coating of deposited glass is formed which varies substantially along the circumference of the substrate tube. The rest, such as the manufacture of certain refractive index profiles and stress profiles forms part of the prior art.

The PCVD deposition was carried out in a substrate tube 1 having a 15 mm inside diameter (1.5 mm wall thickness) using two quartz rods 2, 3 having a diameter of 5 mm each (see FIG. 1). The axes of the quartz rods run parallel to the axis of the substrate tube and their central axes were at a distance of 3 mm from the central axis of the substrate tube. The coating process was carried out using a $SiCl_4$ flow of 170 sccm, a $GeCl_4$ flow of 15 sccm, a $O_2$ flow of 935 sccm and a microwave power of 800 W. In this connection sccm means: cubic centimetre per minute, in relation to standard conditions (273 K, 1013 hPa). The wall thickness of the tube was measured before and after the coating process as a function of the circumferential angle $\alpha$. The angle-dependence of the thickness d of the deposited layer (FIG. 2) resulted from the difference. With a total stroke length of 80 cm, the layer thickness was over a distance of 77 cm not dependent upon the position along the axis of the tube. Due to the influence of the rods the layer thickness varies with a period of 180° between 75 μm and 450 μm (FIG. 2).

The preform was collapsed after the rods has been removed. Subsequently, the refractive index profile was measured as a function of the circumferential angle: the outer cross-section 4 of the preform was circular with a diameter of 10.5 mm and the deposited, $GeO_2$-doped quartz glass 5 had a non-circular cross-section with a large semi-axis of 2.6 mm and a small semi-axis of 1.1 mm (see FIG. 3). Thus, a numerical eccentricity of approximately 0.9 was obtained, which in the case of PCVD deposition of core and cladding regions according to the invention leads to pronounced geometrical and stress-induced birefringence. It is known, that in the case of eccentricities of the core and the optical cladding of 0.9 optical fibres are formed having excellent polarisation-retaining properties.

What is claimed is:

1. In a method of manufacturing an optical fibre, comprising depositing glass in layers on the inner wall of a glass tube which is heated to a temperature between 1100° and 1300° C., and simultaneously depositing glass on a glass rod which is arranged inside the glass tube, by leading a reactive gas mixture through the glass tube at a pressure between 1 and 30 hPa, while inside the glass tube a plasma is made to reciprocate strokewise between two reversal points, then collapsing the glass tube after the deposition of a quantity of glass which corresponds to the intended construction of the optical fibre, so as to form a solid preform from which optical fibres are drawn, the improvement wherein at least two glass rods are arranged inside the tube in such a way that their longitudinal axes run parallel to the longitudinal axis of the glass tube and the at least two glass rods are arranged such that the thickness of the layers deposited on said inner wall varies with a predetermined period along the periphery of said inner wall of the glass tube, and that the glass rods are removed from the glass tube upon completion of the glass deposition and prior to collapse; the presence of the at least two glass rods resulting in the optical fibre being formed as a polarization retaining optical fibre.

2. A method as claimed in claim 1, wherein at least two of the glass rods arranged in the glass tube have a circular cross-section 3. A method as claimed in claim 3, wherein the rod diameters are selected such that the ratio between the rod diameters and the inside diameter of the glass tube is between 0.2 and 0.7.

4. A method as claimed in claim 1 wherein first cladding glass is deposited and then core glass is deposited, the refractive index difference between core and cladding being adjusted to values between $7.8 \times 10^{-3}$ and $1.5 \times 10^{-2}$.

5. A method as claimed in claim 1 wherein a cladding glass is deposited, the doping of which differs from that of the glass tube.

6. A method as claimed in claim 5, wherein boron-doped glass is deposited as the cladding glass.

* * * * *